US005294392A

United States Patent [19]

Marcus

[11] Patent Number: 5,294,392

[45] Date of Patent: Mar. 15, 1994

[54] METHOD OF MAKING BONDED NON-WOVEN POLYESTER FIBER STRUCTURES USING FIBERBALLS

[75] Inventor: Ilan Marcus, Versoix, Switzerland

[73] Assignee: E. I. Du Pont de Nemours and Company, Wilmington, Del.

[21] Appl. No.: 983,985

[22] Filed: Nov. 30, 1992

Related U.S. Application Data

[63] Continuation-in-part of Ser. No. 714,874, Jun. 13, 1991, Pat. No. 5,169,580, which is a continuation-in-part of Ser. No. 549,847, Jul. 9, 1990, abandoned, which is a continuation-in-part of Ser. No. 290,385, Dec. 27, 1988, Pat. No. 4,940,502, which is a continuation-in-part of Ser. No. 921,644, Oct. 21, 1986, Pat. No. 4,794,038, which is a continuation-in-part of Ser. No. 734,423, May 15, 1985, Pat. No. 4,618,531.

[51] Int. Cl.$^5$ .............................................. B29C 43/02

[52] U.S. Cl. .................................... 264/118; 264/122; 264/126

[58] Field of Search ................ 264/122, 123, 126, 118

[56] References Cited

U.S. PATENT DOCUMENTS

| | | | |
|---|---|---|---|
| 4,568,581 | 2/1986 | Peoples, Jr. | 264/126 |
| 4,608,213 | 8/1986 | Kurumizawa et al. | 264/45.1 |
| 4,663,225 | 5/1987 | Farley et al. | 264/126 |
| 4,921,645 | 5/1990 | Insley | 264/6 |

*Primary Examiner*—Mary Lynn Theisen

[57] ABSTRACT

In a batch process for repetitive molding of fiberballs into cushions that are required in the same specific shape in large numbers, the molds are filled continuously by means such as a chute.

4 Claims, No Drawings

METHOD OF MAKING BONDED NON-WOVEN POLYESTER FIBER STRUCTURES USING FIBERBALLS

CROSS REFERENCE TO RELATED APPLICATION

This application is a continuation-in-part of my parent application (DP-4391-A) Ser. No. 07/714,874, filed Jun. 13, 1991, allowed and to issue Dec. 8, 1992, as U.S. Pat. No. 5,169,580, itself a continuation-in-part of my application (DP-4391) Ser. No. 07/549,847, filed Jul. 9, 1990, now abandoned, itself a continuation-in-part of my application (DP-4390) Ser. No. 07/290,385, filed Dec. 27, 1988, now issued as U.S Pat. No. 4,940,502, itself a continuation-in-part of my application Ser. No. 06/921,644,filed Oct. 21, 1986, now issued as U.S. Pat. No. 4,794,038, itself a continuation-in-part of my application Ser. No. 734,423, filed May 15, 1985, now issued as U.S. Pat. No. 4,618,531.

TECHNICAL FIELD

This invention concerns improvements relating to bonded non-woven polyester fiber structures, and more particularly to a new process and apparatus providing novel bonded polyester fiber articles from fiberballs of the polyester fiber blended with binder fibers (of lower melting and softening point than the load-bearing polyester fiber), that are bonded to provide useful new through-bonded articles of improved structure.

BACKGROUND OF THE INVENTION

Thermally-bonded polyester fiber structures were described in my U.S. Pat. No. 4 794 038 (and in many other documents, including, e.g., U.S. Pat. Nos. 4,668,562 and 4,753,693, and WO 88/00258, corresponding to Ser. No. 880,276, filed Jun. 30, 1986). Binder fibers can be intimately blended into the load-bearing polyester fiber to achieve true "through bonding" of the polyester fiber, when they are suitably activated. "Through bonding" has provided higher support and better durability than resin-bonding of polyester fiber (which used to be the conventional method of bonding), and can also provide reduced flammability than conventional resin-bonding. Binder fiber blends had already been used to make batts in furnishing, mattresses and similar uses where high support and good durability were required. They had seldom been used as the only filling material in these end uses, but the common practice was to use the polyester fiber batts as a "wrapping" around a foam core. It is believed that the main reason was that it had been difficult to achieve the desired properties without using such foam core. To achieve the desired resilience and durability, bonded fiber batts would have had to reach high densities, in the 35 to 50 kg/m$^3$ range. Such high densities could not be achieved commercially until more recently. Even then, such condensed (i.e. high density) batts as had appeared on the commercial market in Europe and the U.S. (e.g., in 1987) were nonuniform in density, lower layers being denser than upper layers, which resulted in increased loss of height during use. These high density "block batts" or "fibercores" (as they have sometimes been referred to) were also characterized by relatively poor conformation to a user's body. I believe that this resulted from their structure, since the batts were made from a series of superposed parallel layers; when these parallelized structures are deformed under pressure, they tend to pull in the sides of the whole structure rather than to deform more locally, i.e., to conform to the shape and weight of the user's body, as would latex or good quality polyurethane foam.

Thus, the performance of existing "block batts" made wholly from bonded polyester fiber had not been entirely satisfactory. The difficulty had been how to combine in one structure both durability and conformability to a human body. To obtain durability, with existing "block batts" from superposed carded webs, one had to increase the density until one obtained a structure that did not conform as comfortably as other structures, i.e. not wholly from bonded polyester fiber. I solved this problem according to the invention of my earlier U.S. Pat. No. 4,940,502 (the disclosure of which is hereby incorporated herein by reference) by providing a continuous process and an apparatus for making molded blocks of bonded polyester fiber from a blend of polyester fiber and binder fiber.

An essential element of the solution to the problem was to use a binder fiber blend in a 3-dimensional form, as fiberballs, rather than a flat web or as a formless mass of fibers. Preferred fiberballs (and their preparation and bonding) are the subject of my U.S. Pat. No. 4,794,038, referred to above, the disclosure of which is also hereby incorporated herein by reference, it being understood, however, that other fiberballs may be used, if desired, e.g., as in our U.S. Pat. No. 5,112,684.

A continuous process such as I disclosed in my U.S. Pat. No. 4,940,502 is excellent for producing mattress cores, or similar furnishing products that are flat and rectangular, or whose width varies only slightly within a limited range, so such furniture styles may be continuously produced on a large scale with little variation in cross-section.

A batch process such as I disclosed in my parent application (DP-4391-A), soon to issue as U.S. Pat. No. 5,169,590, is excellent for producing furniture cushions that are in shapes which are not flat and/or not of rectangular cross-section, such as may be required infrequently, and/or on a relatively small scale.

There is, however, a need to provide cushions that are not flat nor rectangular (so not ideally suited for production by the continuous process of U.S. Pat. No. 4,940,502), but are required in the same specific shape in large numbers, for instance cushions for automobiles or other mass-produced items. So it has been desirable to improve on the batch process disclosed in my parent application, U.S. Pat. No. 5,169,580. The disclosure of said patent is hereby incorporated herein by reference, as many aspects of said batch process are, however, suitable for incorporation into a process for mass-production of cushions of a specifically-designed shape (i.e., not flat nor rectangular).

Mass production of cushions of the same size, such as in the automotive car seat industry, has specific requirements which are not easily or economically satisfied. In automotive applications, production runs are very long and processes have to be very cost effective and involve as little labor as possible. I believe that a key problem is the filling of the mold (or a non-woven bag) which has required a lot of handling and has not been cost effective. So, I believe that a process aimed at mass production of cushions should be based on automatic filling of the molds directly, desirably without bag-filling, and preferably coupled with automatic loading and unloading of the molds into the ovens. Filling of fiberballs uniformly into a mold has been quite difficult. It cannot easily be done by sucking or blowing because the air stream is deflected by the walls of the shaped mold, resulting in a non-uniform deposit, generally a lower density in the corners and in angles on the shaped cushion. The present invention is addressed to solving such problems.

In principle, most car seat cushions today are made of three sections; a central one, on which the driver or the passenger sits, and two raised parts (wings), one on each side of the central part. The purpose of the two "wings" is to limit the shifting of the user sideways during turns, accelerations or breaking.

Back cushions are made similarly, but are shaped convexly, for ergonomic considerations, to adapt to the curvature of the human back. Most of today's car seats are made of foam cushions but it would be desirable to produce car seats with additional comfort and that are easier to recycle. I believe that molded polyester cushions produced from a blend of load-bearing fibers and binder fibers offer such feature. The polyester is recyclable by known methods such as methanolysis. So use of polyester fiber would respond to public interest and satisfy government pressure and possible future legislation. Such cushions, would preferably be produced from specific fiber blends, whereby the load-bearing fibers are coated with a hydrophilic slickener and binder fiber, as disclosed in U.S. Pat. Nos. 4,818,599, or the fiberballs in U.S. Pat. Nos. 4,794,038, and 5,112,684. Attempts to produce cushions from fibers have been disclosed in several prior patents, including : GB 2085498-A, GB 4085498-B, J62102709-A (8725), J61279277-A (8704), DE 3132022 C2, GB 2010347, GB 2003204, GB 1530383, U.S. Pat. No. 4,172,174, and U.S. Pat. No. 4,154,051. These prior patents did not, however, achieve my objective of low cost production of car seat cushions made of polyester fibers without additional materials, so as to facilitate recycling, and having other desired features as disclosed below.

SUMMARY OF THE INVENTION

A process according to the present invention is provided based on the concept of using a chute feed to lay down fiberballs continuously as a continuous web in the desired weight per unit area. The feed may consist entirely of fiberballs, consisting essentially of a blend of load-bearing and binder fibers, or, if desired, the fiberballs may be mixed also with loose (free) fibers, more or less as described in my earlier cases. This continuous web is laid down into a succession of separate molds passing beneath the chute. Such a fiberball web (wadding) is preferably generally laid down at the edges in amounts that are larger than the central part of the molds (cushion) so such edges are raised up. The continuous web is cut at the edge of each mold which is raised, to retain the contents, and this can facilitate overfeeding, if so required. The web may then be pressed in place (by stomping) with the upper part of the mold to force the fiberballs to settle in place and fill the lower part of the mold as much as and as uniformly as desired. If, for aesthetic or other reason the raised parts on both parts of the cushion have to be rounded, or have another irregular shape, this can also be achieved by the process of the invention. The fibers and fiberballs in the web are only loosely hanging together so that the closing of the mold can, by the pressure exerted, separate any excess fiber that remains outside the mold and that can be sucked by vacuum and recycled into the feeding system. When required, the lay down can be made in such a way that the central art will have a higher weight per unit area than the sides so as to create a crown or, if desired, a higher density, in the central part of the cushion. Other continuous non-uniform distributions such as channels having a lower thickness than the rest of the wadding can also be achieved via modifications of chute feed systems, and/or appropriate design of the mold portions. Thus the amount and distribution of feed is arranged to produce a crown and/or one or more channels and/or other non-uniform thickness and/or density of feed in the mold to correspond to a desired shape of the resulting cushion. Achieving a pre-formation of the wadding facilitates the achievement of the desired distribution in the mold.

After the fiberball wadding has been deposited inside the bottom part of the mold, the upper part may be used to stomp the filling and force it into place and the mold is closed. The closed mold is then transported into an oven where the binder fiber is activated to bond the cushion. The bonding process itself is using a similar technology to the batch process disclosed in U.S. Pat. No. 5,169,580. As disclosed therein, when hot air is used for the bonding it is important that the system can be sealed so as to force the air to pass through the mold. Different compensating air stream reflectors can be used to overcome the perturbation of the air flow coming from the protruding parts in the cushion. It is usually preferred to inject the hot air from beneath rather than from above. The molds themselves are preferably made from perforated metal sheets or grids and the material may be selected based on a compromise between the air permeability and the required strength of the mold. The density of the cushions can generally vary between 25 and 80 kg/m$^3$, depending on which part of the seat is considered, the firmness, durability and requirements. The binder can also be activated by MW or HF as disclosed in U.S. Pat. No. 5,154,969. In this case the mold should desirably be made of a fiber glass mat or similar materials which absorb as little as possible of these radiations.

From the heating chamber the molds are conveniently conveyed into the cooling zone e.g., in a separate chamber, where air at room temperature, preferably below 15 deg C, is sucked through the molds to cool down the cushions to a temperature of about 30 deg C or less. The molds may then be opened to release the cushions and conveyed to the beginning of the line to be filled again. Such a filling station according to the invention can usually have a much higher capacity than the heating chamber and can therefore supply several heating/cooling stations.

The heating and cooling remain the rate-determining factor of the process of the invention. With high air flows of the order of 50,000 to 200,000 1/m$^2$/min, a seat cushion with a density of 30–40 kg/m$^3$ can be molded in about 1–10 minutes, depending on the cushion shape, the air permeability of the mold and the air permeability of the filling material. I generally prefer molding fiberballs over conventional loose blends of fibers because of the higher air permeability and the better mechanical properties of the resulting molded cushions, and because fiberballs are much easier to distribute in the mold.

I claim:

1. A batch process for molding cushions from a feed consisting of fiberballs of blends of load-bearing fibers and binder fibers, said fiberballs, if desired, being blended with free fibers, including a step of continuously filling a succession of molds by laying down said feed, via a chute, into the bottom of the molds, and cutting the feed so-laid into the molds to separate to feed between individual molds, followed by closing the molds, heating the molds in an oven to heat-activate the binder fibers, and cooling the molds in a cooling zone.

2. A process according to claim 1, wherein the amount and distribution of feed is arranged to produce an irregular shape and/or non-uniform density of feed in the mold to correspond to a desired shape of the resulting cushion.

3. A process according to claim 1, wherein the feed is folded at one or more edges of the molds to produce corresponding raised portions at edges of the resulting cushions.

4. A process according to any one of claims 1,2 or 4, wherein, after the feed has been laid into the molds, it is then shaped by pressure from a upper part of the mold.

* * * * *